(12) United States Patent
Knight (10) Patent No.: US 11,352,276 B2
(45) Date of Patent: Jun. 7, 2022

(54) FLOW STRAIGHTENING VANE FOR AERATOR

(71) Applicant: James A. Knight, Pearl City, IL (US)

(72) Inventor: James A. Knight, Pearl City, IL (US)

(73) Assignee: Aqua-Aerobic Systems, Inc., Loves Park, IL (US)

( * ) Notice: Subject to any disclaimer, the term of this patent is extended or adjusted under 35 U.S.C. 154(b) by 176 days.

(21) Appl. No.: 16/864,259

(22) Filed: May 1, 2020

(65) Prior Publication Data

US 2021/0340040 A1   Nov. 4, 2021

(51) Int. Cl.
| | |
|---|---|
| *C02F 3/16* | (2006.01) |
| *B01F 23/234* | (2022.01) |
| *B01F 27/91* | (2022.01) |
| *B01F 33/503* | (2022.01) |
| *B01F 101/00* | (2022.01) |

(52) U.S. Cl.
CPC .......... *C02F 3/16* (2013.01); *B01F 23/23421* (2022.01); *B01F 27/91* (2022.01); *B01F 33/503* (2022.01); *B01F 2101/305* (2022.01)

(58) Field of Classification Search
CPC .... C02F 3/16; C02F 3/206; C02F 7/00; B01F 3/04773; B01F 7/22; B01F 13/0049; B01F 2215/0052; Y02W 10/10
See application file for complete search history.

(56) References Cited

U.S. PATENT DOCUMENTS

| | | | | |
|---|---|---|---|---|
| 2,063,301 A | * | 12/1936 | Durdin, Jr. ........ | B01F 23/23421 210/197 |
| 2,293,183 A | * | 8/1942 | Walker .............. | B01F 23/23341 210/194 |
| 2,530,814 A | * | 11/1950 | Liebmann ............... | C12M 27/08 261/93 |
| 3,070,229 A | * | 12/1962 | Benozzo .............. | B03D 1/1493 261/87 |
| 3,092,678 A | * | 6/1963 | Braun .................... | C12M 27/20 261/87 |
| 3,532,327 A | * | 10/1970 | Landberg ................ | B01F 27/91 366/302 |
| 3,606,273 A | * | 9/1971 | Johnson ................... | C02F 3/16 261/87 |
| 3,738,773 A | * | 6/1973 | Tinker ................. | F04D 13/066 415/88 |

(Continued)

FOREIGN PATENT DOCUMENTS

JP           S63171699       *   7/1988

OTHER PUBLICATIONS

EPO translation of Ichiro et al. JPS 63171699 published Jul. 15, 1988 (Year: 1988).*

(Continued)

*Primary Examiner* — Stephen Hobson
(74) *Attorney, Agent, or Firm* — Vitale, Vickrey, Niro & Gasey LLP (57) ABSTRACT

The present inventions are generally directed to surface aerators for aerating water or wastewater in a basin, lagoon or tank. In particular, the present inventions relate to flow straightening vanes incorporated into an aerator volute tube that straighten the intake and discharge flow thereby minimizing or eliminating torque on the unit and on the mooring components of the aeration assembly. The present inventions also improve mixing and aeration.

3 Claims, 5 Drawing Sheets

(56) References Cited

U.S. PATENT DOCUMENTS

| | | | | |
|---|---|---|---|---|
| 3,775,307 A * | 11/1973 | McWhirter et al. | .................. | B01F 23/2331 261/87 |
| 3,806,452 A * | 4/1974 | Walker | .................. | B01F 23/233 210/219 |
| 3,836,130 A * | 9/1974 | Earhart | .................. | C02F 3/16 416/223 R |
| 3,846,516 A * | 11/1974 | Carlson | .................. | B01F 23/2331 261/87 |
| 4,277,328 A * | 7/1981 | Pfalzer | .................. | D21F 1/70 261/87 |
| 4,454,077 A * | 6/1984 | Litz | .................. | B01F 23/23341 210/219 |
| RE32,562 E * | 12/1987 | Litz | .................. | B01J 19/1875 210/219 |
| 4,800,017 A * | 1/1989 | Krishnaswamy | .................. | B03D 1/1493 210/219 |
| 4,844,843 A * | 7/1989 | Rajendren | .................. | B01F 23/2331 261/87 |
| 4,919,849 A * | 4/1990 | Litz | .................. | B01J 19/006 261/36.1 |
| 5,314,076 A * | 5/1994 | La Place | .................. | B01F 23/2331 210/219 |
| 5,451,348 A * | 9/1995 | Kingsley | .................. | B01F 23/23341 261/36.1 |
| 5,856,533 A * | 1/1999 | Sweeney | .................. | C07D 301/06 549/534 |
| 5,916,491 A * | 6/1999 | Hills | .................. | B01F 23/2368 261/120 |
| 5,925,290 A * | 7/1999 | Hills | .................. | B01J 19/1875 261/36.1 |
| 6,109,449 A * | 8/2000 | Howk | .................. | B03D 1/1493 261/93 |
| 6,145,815 A * | 11/2000 | Cheng | .................. | C02F 7/00 261/93 |
| 7,172,177 B2 * | 2/2007 | Durda | .................. | B01F 23/2333 261/87 |
| 7,261,279 B2 * | 8/2007 | Boulant | .................. | B01F 23/23341 261/36.1 |
| 7,398,963 B2 * | 7/2008 | Hills | .................. | B01F 23/2331 261/87 |
| 8,308,143 B2 * | 11/2012 | Chevalier | .................. | C02F 3/16 261/28 |
| 10,343,123 B2 * | 7/2019 | Metzler | .................. | B01F 23/291 |
| 10,865,459 B2 * | 12/2020 | Latva-Kokko | .................. | B01J 19/006 |
| 2016/0060150 A1 * | 3/2016 | Beaudouin | .................. | C02F 3/16 210/150 |

OTHER PUBLICATIONS

Aqua-Aerobic Systems, Inc., Aqua-Jet Surace Mechanical Aerator, brochure. 2019.

* cited by examiner

FLOW STRAIGHTENING VANE FOR AERATOR

FIELD OF THE INVENTION

The present inventions are generally directed to surface aerators for aerating water or wastewater in a basin, lagoon or tank. In particular, the present inventions relate to flow straightening vanes incorporated into an aerator volute tube that straighten the intake and discharge flow thereby minimizing or eliminating torque on the unit and on the mooring components of the aeration assembly. The present inventions also improve mixing and aeration.

BACKGROUND OF THE INVENTION

Surface aerators for use in the treatment of water and wastewater are well known in the art. Preferred examples of such devices are sold under the name Aqua-Jet® by Aqua-Aerobic Systems, Inc., the assignee of this patent (see www.aqua-aerobic.com). Other examples of the structure and operation of typical surface aerators may be found in U.S. Pat. Nos. 3,606,273 and 3,836,130.

In general, the typical high speed surface aerator includes an annular float which supports the mechanics of the aerator on the surface of a fluid to be aerated. A drive motor is provided having a centrally positioned drive shaft and a propeller attached to the end of the drive shaft. The drive shaft extends downwardly from the motor. The motor is in turn attached above a diffusion head, which is a generally cylindrical casting which functions to discharge the fluid radially outward from the aerator assembly. Attached to the bottom of the diffusion head is a downwardly extending cylindrical volute tube that houses the drive shaft and propeller. An intake cone may be provided at the lower end of the volute tube. The float and associated mechanical components of the aerator assembly are moored into a stationary position in the tank, basin or lagoon.

In operation, the aerator assembly and float are placed in a tank, basin or lagoon and the assembly floats on the surface of the liquid to be aerated. The liquid is pumped by the propeller vertically upward through the intake cone and the volute tube. Upon contact with portions of the cone shaped fluid diffuser, the liquid is dispersed radially outward from the diffusion head and into the basin, tank or lagoon. Oxygen transfer occurs both in the fluid diffuser and when the axially dispersed spray from the diffusion head re-enters the liquid surface.

Surface aerators, such as those described above, have been used for many years with satisfactory results. It has been determined, however, that known surface aerators tend to torque or rotate in the opposite direction of propeller rotation. The mooring components typically restrain this torque and keep the aerator assembly in a fixed position. As a result, however, the mooring components must be more substantial to overcome this torque and prevent rotation of the aerator assembly. By greatly reducing or eliminating the torque, the mooring requirements can be lessened to the extent that units can be installed much more easily. For example, current aerator placement in a covered tank requires entry to install restrained mooring posts (or similar). With reduced torque, a simplified mooring arrangement may permit placement without tank entry. Weighted cables may be sufficient to keep the aerator in place without risk of the aerator turning (twisting). In addition, the liquid spray from the diffusion head also has a rotation in the same direction of propeller rotation. This rotation creates an inefficiency in the aeration and oxygen transfer to the liquid to be treated.

With known surface aerators, it was believed that the torque on the system and the mooring assembly was related to the torque of the motor. The present inventions have established that is not the case. Instead, and as discussed below, the torque on the mooring system is in response to the rotational element of the hydraulic discharge from the aerator. Accordingly, if the discharge flow is redirected to a substantially radial direction, the torque on the float and mooring system is substantially reduced or eliminated.

Thus, there is a need to improve the performance of surface aerators by straightening the liquid flow into and out of the aerator to eliminate rotation and torque on the unit and to improve the oxygen transfer performance of the aerator. The present inventions are directed to such needs, among others.

SUMMARY OF THE INVENTION

The present inventions preserve the advantages of known surface aerators and also provide new features, advantages and results.

Therefore, it is an object of the present invention to eliminate or reduce the rotation and/or torque on the aerator assembly imparted by the operation of the aerator and/or the rotation of the hydraulic discharge.

Another object of the present invention is to straighten (i.e., to be radially oriented without rotation) the intake flow into the volute tube and the discharge flow of the liquid out of the diffusion head.

An additional object of the present invention is to increase oxygen transfer.

A further object of the present invention is to provide a larger spray diameter of the discharge from the diffusion head to increase mixing and/or aeration.

Still another object of the present invention is to permit the use of simpler and/or less expensive mooring systems that permit, among other things, more efficient placement into, for example, covered tanks.

Still a further object of the present invention is to provide a flow straightening vane that may be part of the initial aerator assembly or later retrofitted or inserted into an aerator assembly.

Accordingly, the present inventions provide a flow straightening vane for use in a surface aerator assembly, the aerator assembly including an annular float, a motor with a downwardly projecting rotatable drive shaft terminating in an impeller having a blade with a leading edge, a diffusion head and a downwardly projecting volute tube, the flow straightening vane including a substantially flat body portion, the body portion having a mounting portion at an upper end, a bottom portion terminating in a lower end portion and having a width. The body portion further includes an inner length and an outer length; wherein the mounting portion is secured to the aerator assembly such that outer length is adjacent to an interior surface of the volute tube and the outer length projects inwardly into the volute tube towards the drive shaft; and wherein the upper end of the body portion is attached to the aerator assembly and the lower end portion is adjacent to the impeller, and which is curved or otherwise deformed in a direction opposite to the rotation of the impeller. The flow straightening vane may also provide an upper end portion that projects into a portion of the diffusion head. In a preferred embodiment, the amount of curvature of the lower end portion is approximately 15%-

20% of the inner length of the vane. The flow straightening vane may also include a curvature at the lower end that is approximately 15%-20% of the inner length of the vane.

INVENTOR'S DEFINITION OF THE TERMS

The terms used in the claims of this patent are intended to have their broadest meaning consistent with the requirements of law. Where alternative meanings are possible, the broadest meaning is intended consistent with the understanding of those of ordinary skill in the art. All words used in the claims are intended to be used in the normal, customary usage of grammar and the English language.

BRIEF DESCRIPTION OF THE DRAWINGS

The stated and unstated objects, features and advantages of the present inventions (sometimes used in the singular, but not excluding the plural) will become apparent from the following descriptions and drawings, wherein like reference numerals represent like elements in the various views, and in which.

DETAILED DESCRIPTION OF PREFERRED EMBODIMENTS

Set forth below is a description of what is currently believed to be the preferred embodiments or best representative examples of the inventions claimed. Future and present alternatives and modifications to the embodiments and preferred embodiments are contemplated. Any alternatives or modifications which make insubstantial changes in function, purpose, structure or result are intended to be covered by the claims of this patent.

Figure 1A:
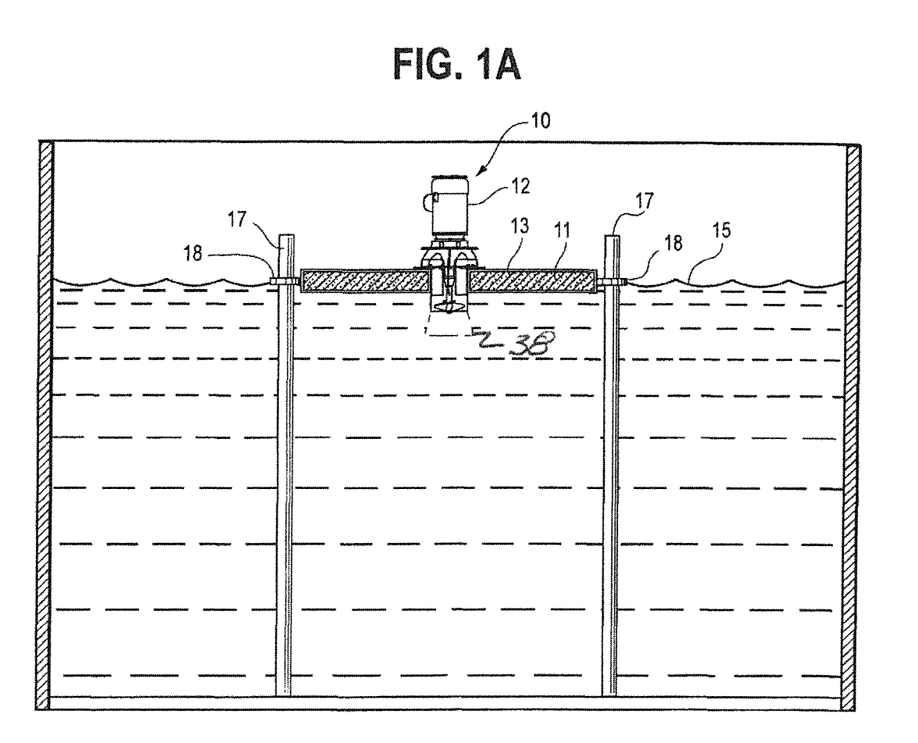
FIG. 1A is a side perspective view of an aerator assembly shown moored in a tank with portions removed to show components of the preferred embodiment of the present invention.
Figure 1B:
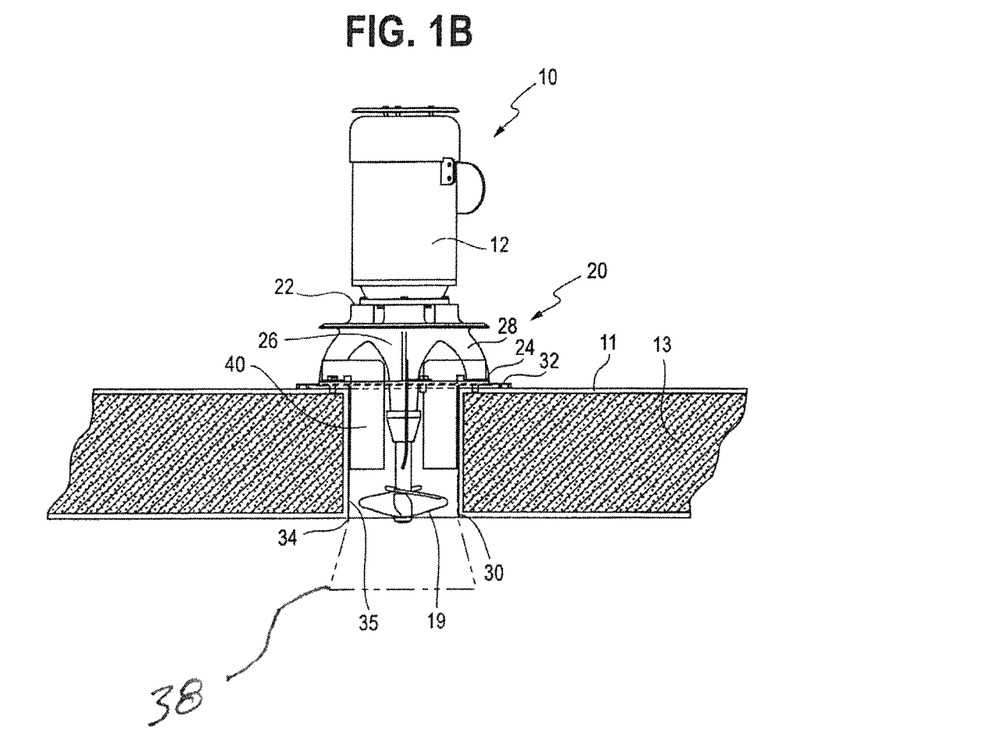
FIG. 1B is a side perspective view of the aerator assembly of FIG. 1A with portions removed to better show components of a preferred embodiment of the present invention.
Figure 4:
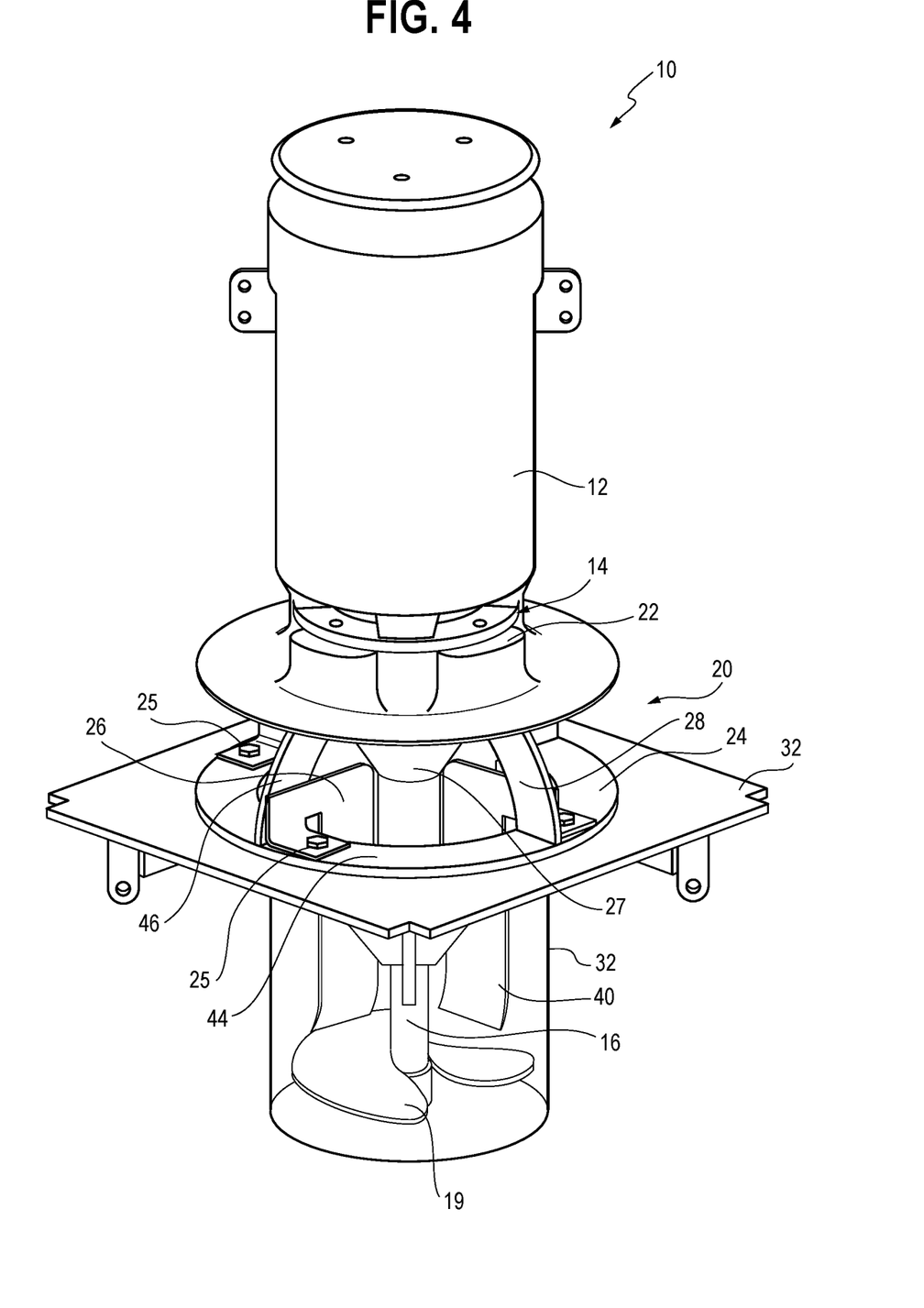
FIG. 4 is a top side perspective view of a preferred embodiment of the present invention.

The components of a typical surface aerator, including the improvements of the present inventions, are shown as 10 in FIGS. 1A, 1B and 4, and are referred to herein as an aerator or aerator assembly 10. Aerator assembly 10 typically includes an annular float 11 as will be understood by those of skill in the art. The float 11, which is usually foam filled 13, keeps the aerator equipment afloat on the surface of the liquid 15 to be aerated.

The aerator assembly 10, including float 11, is moored within the tank, basin or reservoir to keep it properly and securely positioned. There are a variety of known mooring arrangements that depend upon the particular application. For example, there is restrained mooring that uses vertical mooring posts 17 secured to the tank or basin as shown in FIG. 1A. Ring-like mooring brackets 18 on the exterior circumference of float 11 secure the unit in the basin or lagoon and enable the aerator assembly 10 to slide up and down the posts 17 depending upon the liquid level 15. Among other things, it is the torque on these and other mooring components that is eliminated or reduced by the present invention.

As will be understood by those of skill in the art, there is also post mooring (not shown). In this arrangement, posts are installed on shore and cables run from the posts to the float. There is also pivotal mooring (not shown). In this type of mooring, there is an arm that is pivotably mounted on the shore and reaches to the unit. The arm is attached to the unit and pivots up and down depending upon the water level. Without the use of the present inventions as discussed herein, there is, among other things, unwanted torque on the mooring components.

The basic components of aerator assembly 10 include a motor 12 having a base plate 14. The motor 12 drives a downwardly projecting drive shaft 16 that includes a plurality of propeller blades 19 at its lower end. A fluid deflector 23 may also be provided. The propeller blades 19 have a leading edge 19a that faces in the direction of rotation when in use. A diffusion head 20 is also provided. Diffusion head 20 includes a motor mount portion 22 at its upper end and a lower mounting portion 24 at its lower end. The base plate 14 of the motor 12 is attached to upper motor mount portion 22 of diffusion head 20. Spaced between the upper motor mount portion 22 and the lower mount portion 24 is a fluid diffuser or throat area 26. As will be understood by those of skill in the art, diffuser portion 26 is typically part of the casting used to create the diffusion head 20. As will be understood by those of skill, diffusion head 20 includes an inner surface 27 which extends axially and then radially outward from its center to provide an almost 360° axial discharge of the water to be aerated around the aerator assembly 10. A plurality of legs 28 are also provided which are attached to or formed as part of lower mount portion 24 of diffusion head 20.

Typical surface aerator assembly 10 includes a generally cylindrical and hollow volute tube 30. Volute tube 30 which includes a top plate 32 at its upper end 31 to which the lower mount portion 24 of diffusion head 20 is attached by bolts 25 or other known means. As will also be understood by those of ordinary skill in the art, generally horizontal top plate 32 may be used to secure the aerator assembly 10 to the annular float 11. Volute tube 30 further includes a lower end 34 to which an optional intake cone 38 may be attached. The volute tube 30 includes an interior surface 35 having an inner diameter 36. Flow straightening vanes 40 of the present invention are inserted within or made as part of the interior of volute tube 30 as hereinafter described.

Figure 2:
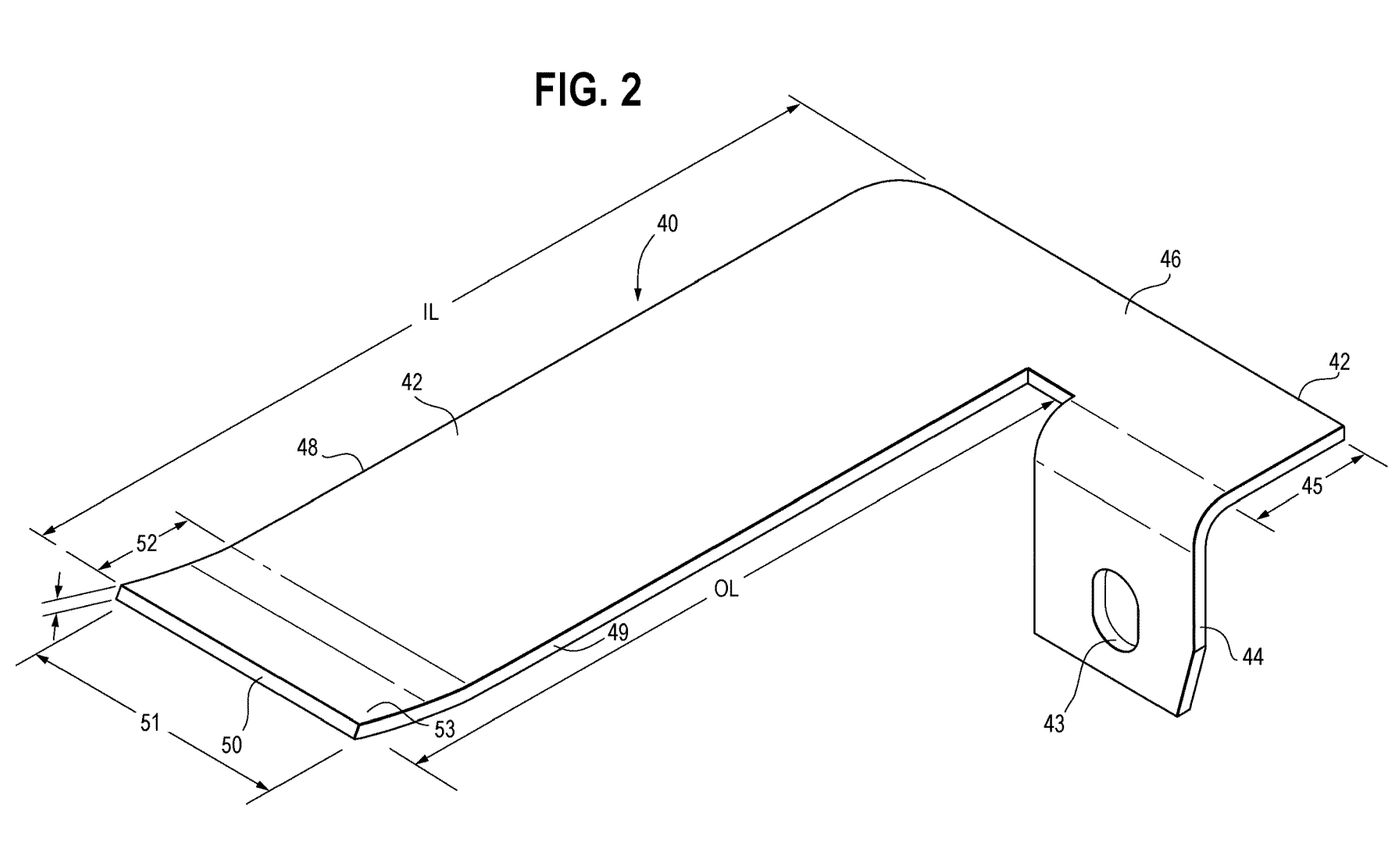
FIG. 2 is a side perspective view of a preferred embodiment of a flow straightening vane of the present invention.

By reference to FIG. 2, a preferred embodiment of the flow straightening vanes 40 is provided. Each vane 40 includes a body portion 42 having an inner length IL, an outer length OL, a mounting flange 44 and an upper portion 46 having a length 45. Vane 40 has an interior edge 48, an outer edge 49, an upper edge 47 and a lower edge 50. Preferred vane 40 also includes a lower end portion having a length 52, which is a portion of the IL and the OL. In a preferred embodiment, lower end portion 52 is curved 53, the remainder of vane 40 being generally flat. In a preferred embodiment, the amount of curvature 53 of the lower end portion 52 is approximately 15-20% of the inner length IL of vane 40. Other amounts of curvature may also be available, which will vary depending upon unit 10 size and propeller aspects, as will be understood. Vane 40 also has a width 51 and a thickness 54. As will be understood by those of skill in the art, the difference between the interior length IL and the outer length OL results in an upper portion 46 having a length 45. A mounting portion 44 is connected to or formed as part of upper portion 46. Mounting flange 44 is generally perpendicular to body portion 42 and may include a bolt hole 43. In this preferred manner, vane 40 may be attached to top plate 32 of volute tube 30 or in other ways as understood by those of skill in the art.

Figure 3:
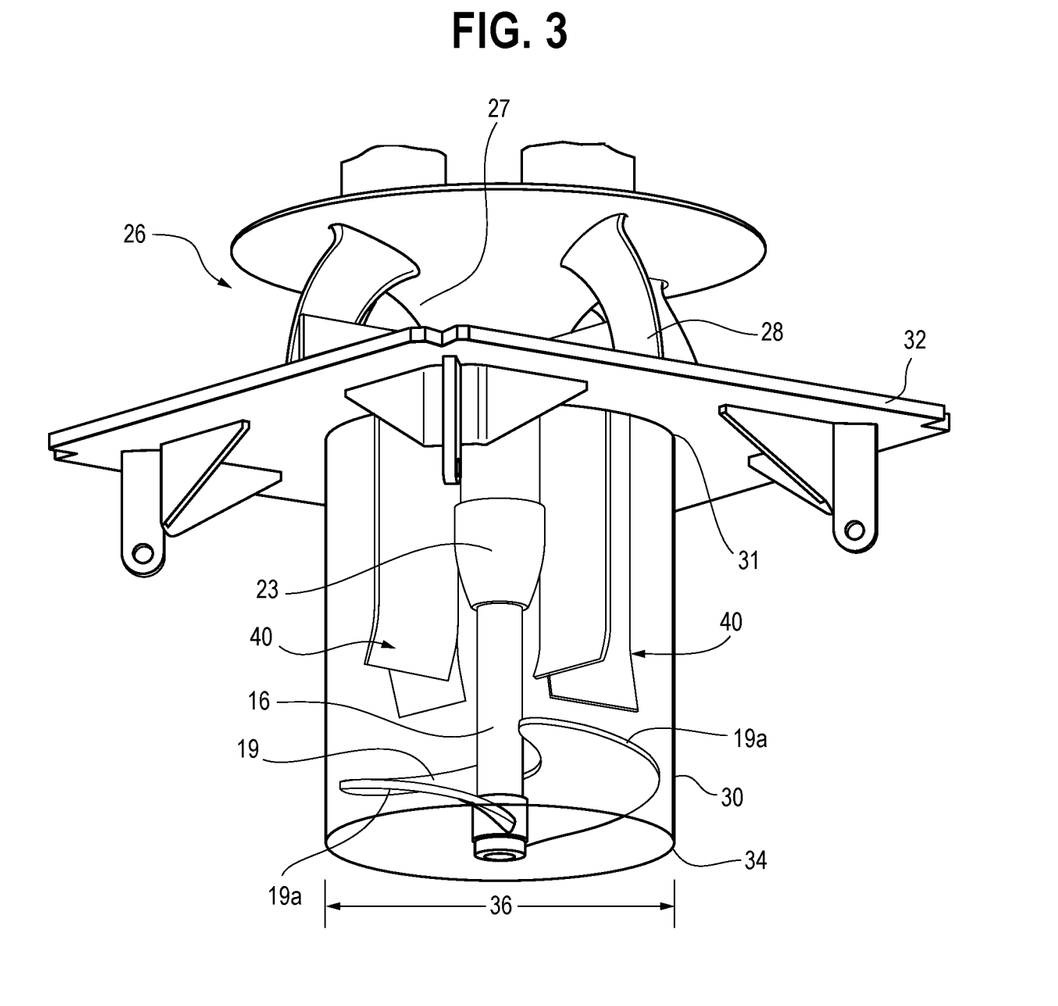
FIG. 3 is a bottom side perspective view of a preferred embodiment of the present invention installed in a representative aerator.

As best shown in FIGS. 1B, 3 and 4, vane 40 extends within volute tube 30. In a preferred embodiment, a plurality of vanes 40 are installed within volute tube 30. Preferably, four vanes 40 are installed every 90° around the circumference of volute tube 30. However, it will be understood by those of skill in the art that more or fewer vanes 40 may be utilized. In a preferred embodiment, the outer edge 49 of vane 40 is adjacent to interior surface 35 of the volute tube 30 and is installed or attached generally vertical. As shown in FIGS. 1B and 4, the upper portion 46 of vane 40 extends above the top of volute tube 30 and into diffusion head 20 which is preferred, but not required. Upper portion 46 serves to aid in straightening the flow out of diffusion head 20. The interior edge 48 of vane 40 projects into the volute tube.

In a preferred embodiment, vane 40 is attached to lower mounting portion 24 via mounting flange 44 so that the body portion 42 of vane 40 is within volute tube 30 and upper portion 46 of vane 40 projects into the diffusion head 20. The lower end 50 of vane 40 is situated above propeller blades 19. It will be understood by those of skill in the art that vane 40 may be attached to volute tube 30 in other ways. For example, vane 40, with or without upper portion 46 having a length 45, may be welded or otherwise secured to inner surface 35 of volute tube 30. As will also be understood by those of skill in the art, width 51 of vane 40 must not interfere with operation of shaft 16. Similarly, the length of vane 40 that projects downwardly in volute tube 30, i.e., the length of the outer edge 49, i.e., the position of lower edge 50, in the preferred embodiment, must not interfere with the operation of impeller 19.

As previously indicated, in aerator units without vanes 40 of the present invention, the unit tends to torque or rotate in the opposite direction of impeller 19 rotation. Also as indicated, the fluid discharge tends to rotate in the same direction as the propeller 19 rotation. This causes the assembly to rotate or torque in the opposition direction. Thus, if the impeller 19 is rotating in a clockwise direction when viewed from below, the unit will want to rotate in a counterclockwise direction when viewed from below. The fluid discharged from the unit rotates in the same direction of the impeller rotation, i.e., clockwise for the impeller 19 and clockwise for the discharge. This causes undesired torque or rotation on the aerator assembly, which leads to undesired torque on the mooring assembly and/or inefficient aeration at the discharge.

The present inventions overcome these problems by the inclusion of flow straightening vanes 40. In particular, flow straightening vanes 40 having a lower end 52 (having a curved or deformed portion 53 which is curved into the direction of fluid flow and/or rotation) is preferred. However, although not preferred, a non-deformed or bent lower edge 50 may also be used. Similarly, a vane 40 having an upper portion 46 projecting into the diffusion head 20 is also preferred but not required.

The structure and operation of preferred flow straightening vane 40 may best be seen by reference to FIGS. 2 and 3. As shown in the exemplary embodiment, each blade of impeller 19 has a leading edge 19a. In operation, shaft 16 of motor 12 rotates in the direction of the leading edge 19a. If viewed from below, rotation of the impeller 19 and leading edge 19a is in a clockwise direction. This forces the liquid to flow in a clockwise rotation and up volute tube 30 and out diffusion head 20. Importantly, the deformed portion 53 of lower edge 52 of vanes 40 are curved in the opposite direction of impeller 19 rotation, in a counterclockwise direction when viewed from below. At the same time, the curved portion 53 points into the clockwise direction of flow.

In this manner, the flow is straightened as it passes vanes 40 up through volute tube 30. This reduces the torque on aerator assembly 10. Thus, it also reduces the stress on the mooring components, such as poles 17. In addition, the rotation imparted to the liquid spray in traditional aerators is reduced or eliminated. Similarly, by including upper portion 46 on vane 40 that projects into the diffusion head 20, the rotation of the discharged fluid is further reduced. This leads to greater efficiency in aeration and oxygen transfer to the liquid to be treated.

The above description is not intended to limit the meaning of the words used in or the scope of the following claims that define the invention. Rather, it is contemplated that future modifications in structure, function or result will exist that are not substantial changes and that all such insubstantial changes in what is claimed are intended to be covered by the claims. Thus, while preferred embodiments of the present inventions have been illustrated and described, it will be understood that changes and modifications can be made without departing from the claimed invention. In addition, although the term "claimed invention" or "present invention" is sometimes used herein in the singular, it will be understood that there are a plurality of inventions as described and claimed.

Various features of the present inventions are set forth in the following claims.

What is claimed is:

1. A flow straightening vane for use in a surface aerator assembly, the aerator assembly including an annular float, a motor with a downwardly projecting rotatable drive shaft terminating in an impeller having a blade with a leading edge, a diffusion head and a downwardly projecting volute tube, the flow straightening vane comprising:
   a substantially flat body portion, the body portion having a mounting portion at an upper end, a bottom portion terminating in a lower end portion and having a width;
   the body portion further including an inner length and an outer length;
   wherein the mounting portion is secured to the aerator assembly such that outer length is adjacent to an interior surface of the volute tube and the outer length projects inwardly into the volute tube towards the drive shaft;
   and wherein the upper end of the body portion is attached to the aerator assembly and the lower end portion is adjacent to the propeller, and which is curved or otherwise deformed in a direction opposite to the rotation of the impeller.

2. The flow straightening vane of claim 1 wherein the lower end portion is curved approximately 15%-20% of the inner length of the vane.

3. The flow straightening vane of claim 1 wherein the upper end portion projects into the diffucsion head.

* * * * *

UNITED STATES PATENT AND TRADEMARK OFFICE
CERTIFICATE OF CORRECTION

| | |
|---|---|
| PATENT NO. | : 11,352,276 B2 |
| APPLICATION NO. | : 16/864259 |
| DATED | : June 7, 2022 |
| INVENTOR(S) | : James A. Knight |

Page 1 of 1

It is certified that error appears in the above-identified patent and that said Letters Patent is hereby corrected as shown below:

In the Claims

Claim 3, Column 6, Line 62: "diffucsion head" should read --diffusion head--

Signed and Sealed this
Nineteenth Day of July, 2022

*Katherine Kelly Vidal*

Katherine Kelly Vidal
*Director of the United States Patent and Trademark Office*